United States Patent [19]

Yang

[11] Patent Number: 5,201,596
[45] Date of Patent: Apr. 13, 1993

[54] DRAFT-PAPER RACK FOR A COMPUTER

[75] Inventor: Yeong-San Yang, Tao-Yuan, Taiwan

[73] Assignee: Industrial Technology Research Institute, Hsinchu, Taiwan

[21] Appl. No.: 854,546

[22] Filed: Mar. 18, 1992

[51] Int. Cl.⁵ ............................................. B41J 29/15
[52] U.S. Cl. ...................................... 400/718; 40/343
[58] Field of Search ................... 400/718, 642, 718.1, 400/718.2; 248/442.2; 40/342, 343

[56] References Cited

U.S. PATENT DOCUMENTS

| | | | |
|---|---|---|---|
| 3,449,849 | 6/1969 | Pasquale et al. | 40/343 |
| 3,882,620 | 5/1975 | Grindle | 40/343 |
| 4,838,720 | 6/1989 | Sakai et al. | 400/718 |

FOREIGN PATENT DOCUMENTS

| | | | |
|---|---|---|---|
| 0389772 | 10/1990 | Fed. Rep. of Germany | 400/718 |
| 0686085 | 3/1965 | Italy | 400/718 |

Primary Examiner—Edgar S. Burr
Assistant Examiner—Lynn D. Hendrickson
Attorney, Agent, or Firm—W. Wayne Liauh

[57] ABSTRACT

A draft-paper rack structure for a computer which comprises a chassis, a supporting seat, a draft-paper rack, a transparent hood, a roller and an angle-setting knob; in fact, it is a clamp assembly for a typewriter to be designed into a clamp structure to be fastened on a computer keyboard so as to place a draft paper between the computer screen and the keyboard to enable a user to enter data into a computer without looking left and right (or back and forth) between a draft paper and the computer screen; a user may merely watch or scan up and down between a computer screen and a draft paper; the draft-paper rack structure is provided with an electro-motive adjusting knob to move a draft paper upward a suitable distance; a transparent hood mounted on the draft-paper rack has a line indicator for clearly indicating the lines of a draft being keyed in; the draft-paper rack can be clamped on a keyboard or a table having variable thickness, and it can also be placed on a desk; the rack can be set at a given slanting angle as desired, and the base elements of the chassis thereof can be extended backward so as to enable a draft paper to be placed at a stable position; the draft-paper rack can provide a user with a comfortable and practical key-in operation.

1 Claim, 7 Drawing Sheets

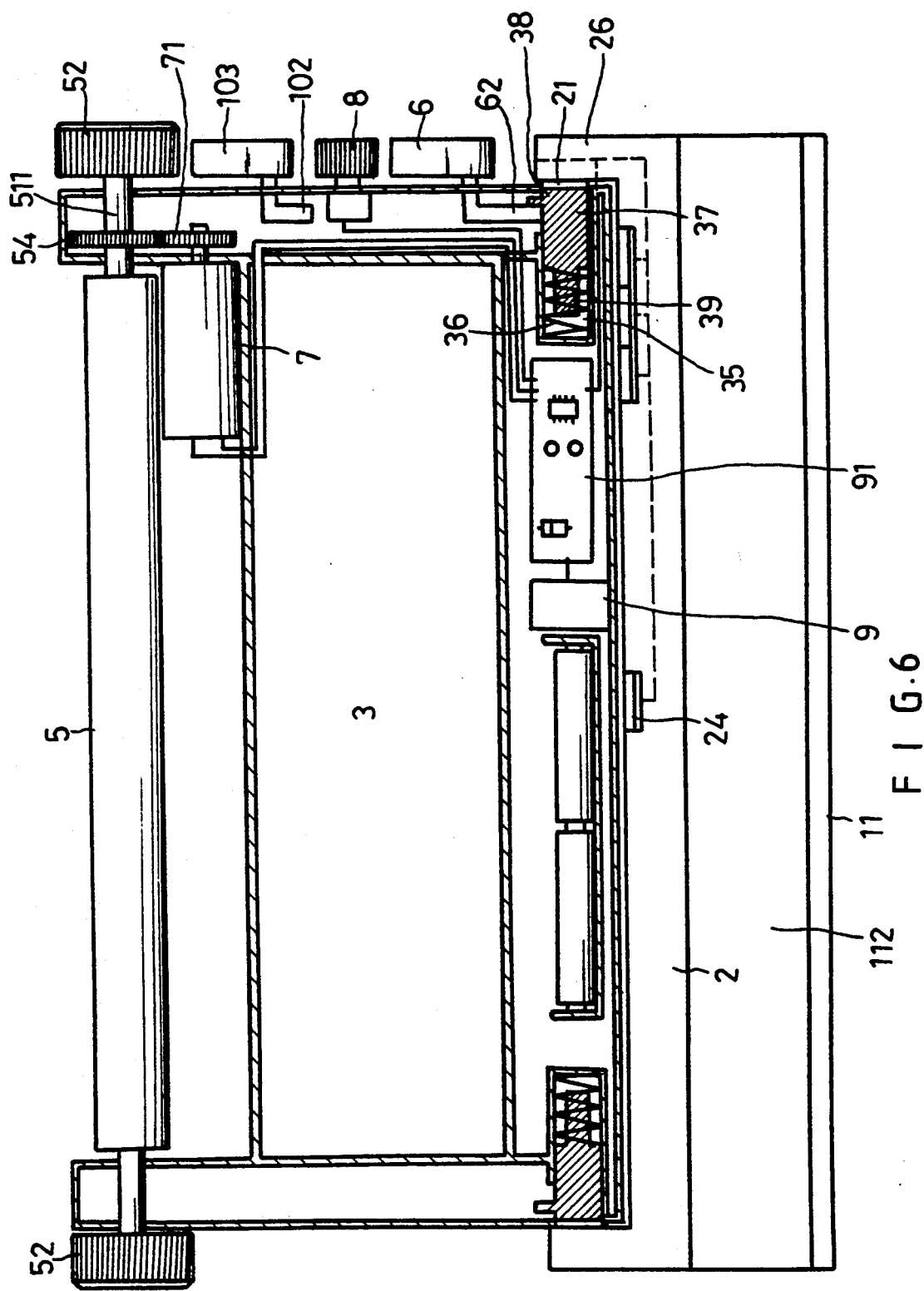

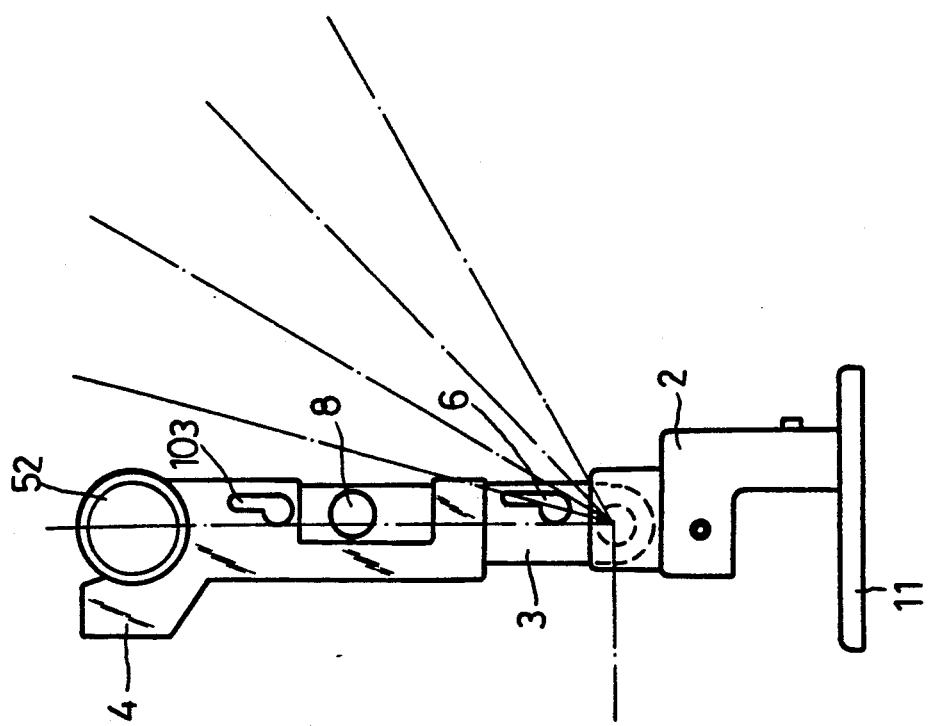

DRAFT-PAPER RACK FOR A COMPUTER

BACKGROUND OF THE INVENTION

The conventional draft-paper rack for a typewriter is merely a clamp board being mounted on a desk, and a typist during typing has to watch back and forth between a draft paper and a typewriter (or a computer screen). A typist would feel rather tired from such a monotonous gesture for a long period of time. A long time of key-in work in such a gesture, a typist would be easy to make mistakes of skipping over a line or repeating a line. Under the highly developed industrial time, every thing requires "rapidness" and "accuracy"; therefore, the aforesaid problem pertaining to typing has to be solved so as to have a typing work become rapid and accurate without error.

SUMMARY OF THE INVENTION

This invention relates to a draft-paper rack structure for a computer, and it mainly comprises a chassis, a supporting seat, a draft-paper rack, a transparent hood, a roller and an angle-setting knob. The prime object of the present invention is so designed that the draft-paper rack structure can be mounted to a computer keyboard at a level between a computer screen and a keyboard; a user can easily scan a draft paper and the computer screen at a given angle during key-in operation so as to make the key-in operation simple and efficient.

Another object of the present invention is to provide a draft-paper rack structure, which has an angle-setting knob for setting the draft-paper rack backwards at various steps so as to provide a user with a better viewing position. The draft-paper rack can also be folded at a horizontal positional over a keyboard for storage.

Still another object of the present invention is to provide a draft-paper rack structure, in which an adjusting assembly is furnished to control a draft paper to move up or down a line desired above a line indicator so as to insure a fast and correct key-in operation.

BRIEF DESCRIPTION OF THE DRAWINGS

FIG. 6 is a front sectional view of the present invention after a transparent hood being removed.

FIG. 11 is a side view of the draft paper rack, being slanted at various angles desired.

DETAILED DESCRIPTION

Figure 2:
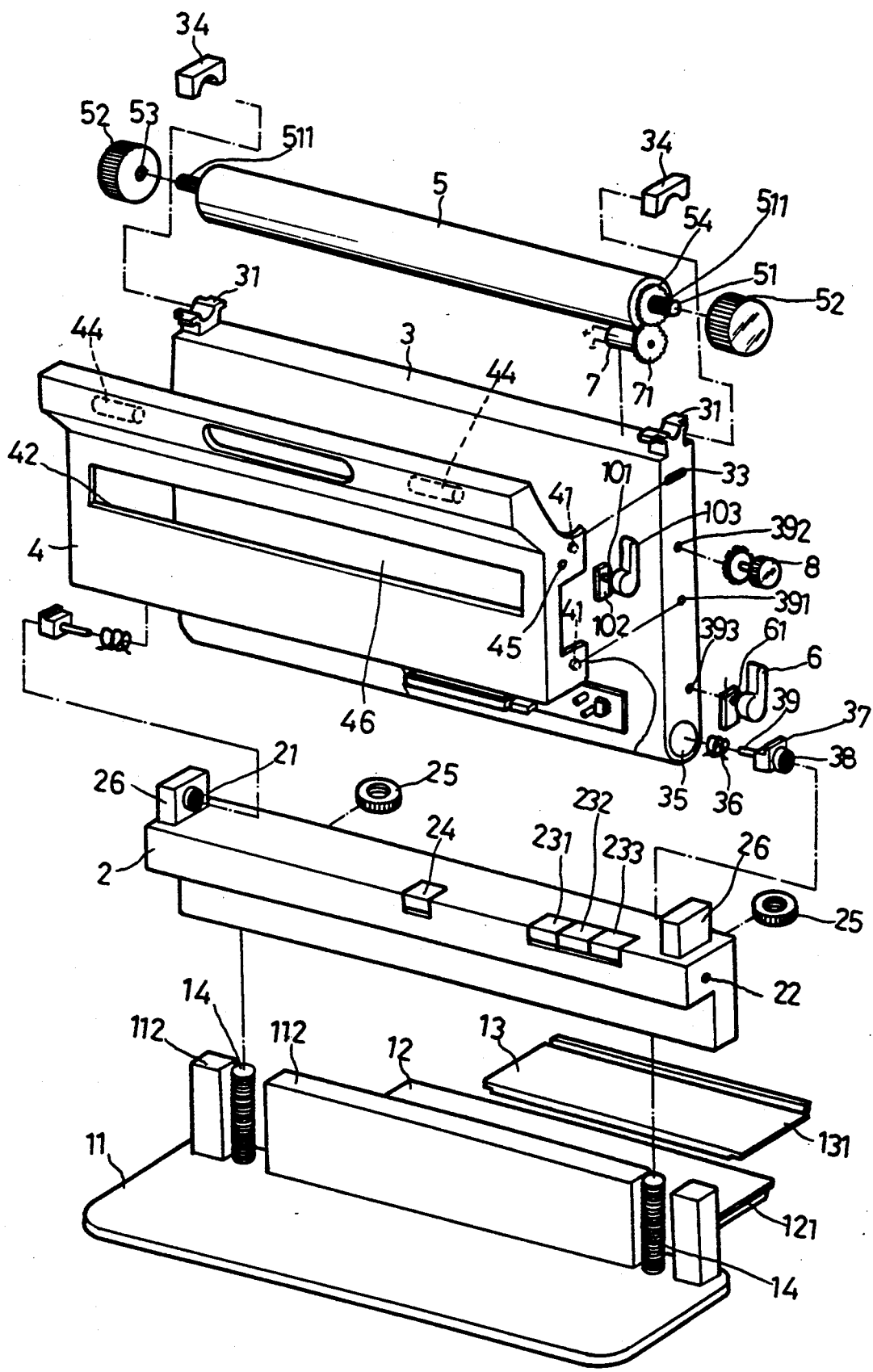
FIG. 2 is a disassembled view of the present invention.

FIG. 2 is a disassembled and perspective view of the present invention, which comprises:

A three-piece chassis, i.e., base elements 11, 12 and 13, which are fastened together with a supporting seat 2 by means of screws; a draft-paper rack 3 is fixedly mounted on the supporting seat 2; the draft-paper rack 3 is covered with a transparent hood 4; the upper part of the draft-paper rock 3 is fixedly mounted with a roller 5.

Figure 5:
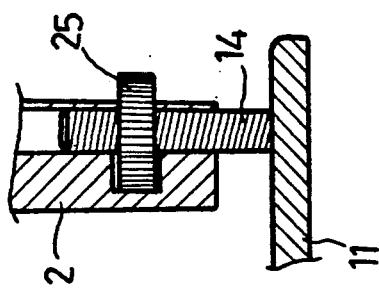
FIG. 5 is a sectional view of a nut-and-screw assembly according to the present invention.
Figure 4:
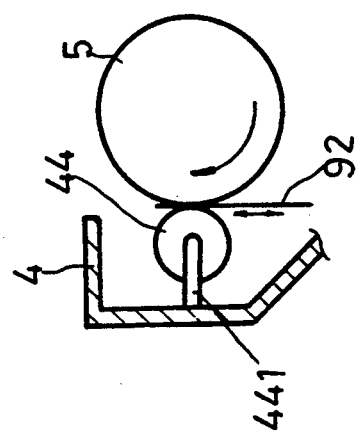
FIG. 4 is a sectional view of the draft paper clamping assembly in the present invention.
Figure 7:
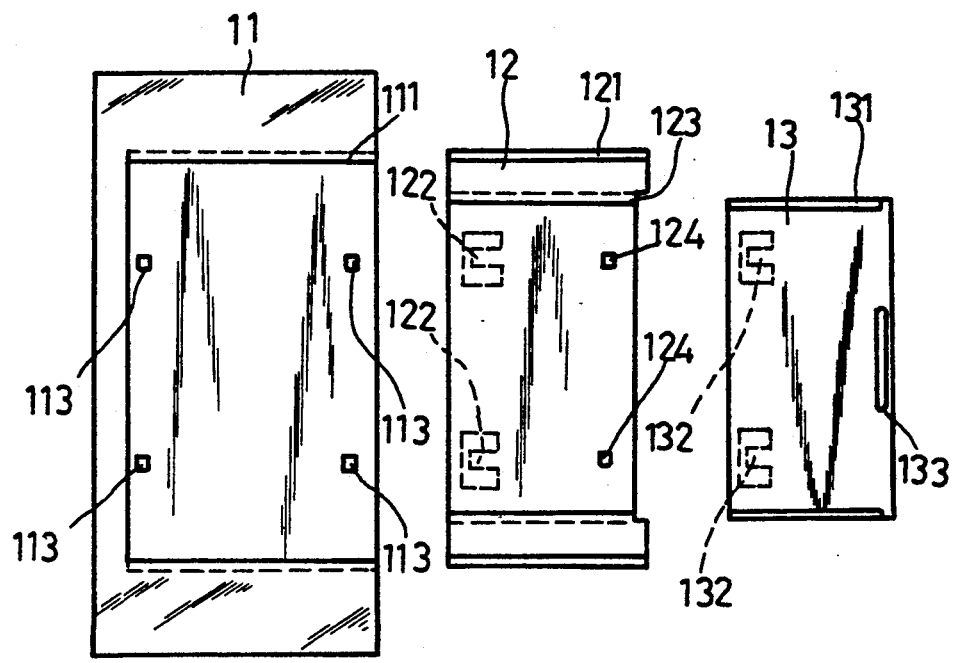
FIG. 7 is a disassembled bottom view of the three-piece chassis according to the present invention.
Figure 8:
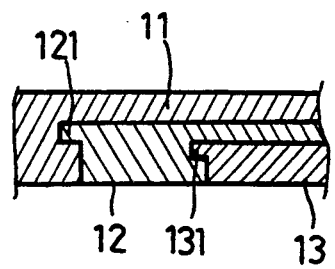
FIG. 8 is a cross section view of the chassis as shown in FIG. 7.
Figure 9:
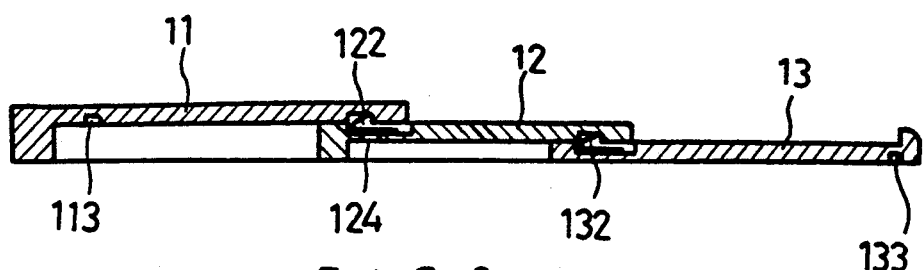
FIG. 9 is a longitudinal section view of the chassis as shown in FIG. 7.

The three-piece chassis includes three base elements 11, 12 and 13 as shown in FIGS. 7, 8 and 9; each base element is a flat board; both sides of the base element 13 each have a flange 131 to be engaged in a groove 123 under the base element 12; both sides of the base element 12 also have flanges 121 respectively to be engaged in two corresponding grooves 111 of the base element 11; the base elements from 12 and 13 each have stop blocks 122 and 132 to prevent the base element from being disengaged each other unintentionally; the aforesaid base elements can be pulled out to a given extent. The top side of the base element 11 is furnished with guard blocks 112 and two screw rods 14 which are to be mated with two corresponding nuts 25 in a supporting seat 2 (as shown in FIG. 5) so as to adjust the space between the base element 11 and the supporting seat 2 to facilitate the supporting seat and the chassis to clamp to a keyboard or a table.

A supporting seat 2, of which each of the two ends of the top surface is furnished with a seat block 26 respectively; one end of the supporting seat 2 has a power supply terminal 22; the inner side of each seat block 26 has a ratchet 21; the top of the supporting seat 2 is mounted with a backward rotation key 231, a forward rotation key 232 and a switch key 233; the center part of the supporting seat 2 has a step key 24; all the aforesaid keys are connected with the related circuit so as to control a draft paper to move. The nuts 25 are mounted behind the supporting seat 2 to be mated with the screw rods 14 on the base element 11. Each of the two lower ends of the draft-paper rack 3 (as shown in FIGS. 2 and 6) are provided with one corresponding round holes 35, each of which each has a spring 36 and a ratchet fastening block 37; the outer side of the ratchet fastening block 37 has a ratchet 38, while the inner side thereof has a pin 39, on which a spring 36 is mounted to push against the ratchet fastening block 37 and the ratchet 38, which is engaged with a ratchet 21 on the seat block 26 so as to enable the draft-paper rack 3 to slant forwards or backwards at a given angle as desired. Both ends of the draft-paper rack 3 are furnished with round holes 391 and a sliding slots 33 respectively; one end of the rack 3 is furnished with small round holes 392 and 393, and the top of each end of the rack 3 is furnished with a roller seat 31 respectively for mounting a roller 5.

Figure 3:
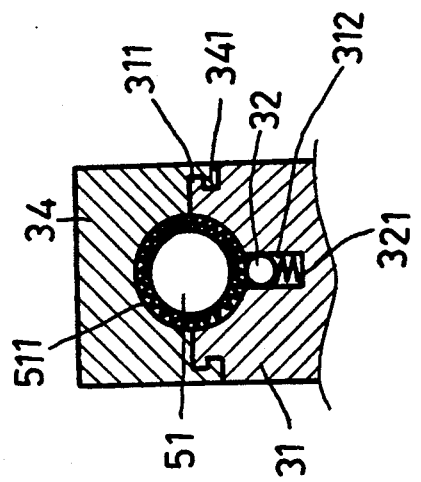
FIG. 3 is a sectional view of a roller-mounting assembly in the present invention.
Figure 10:
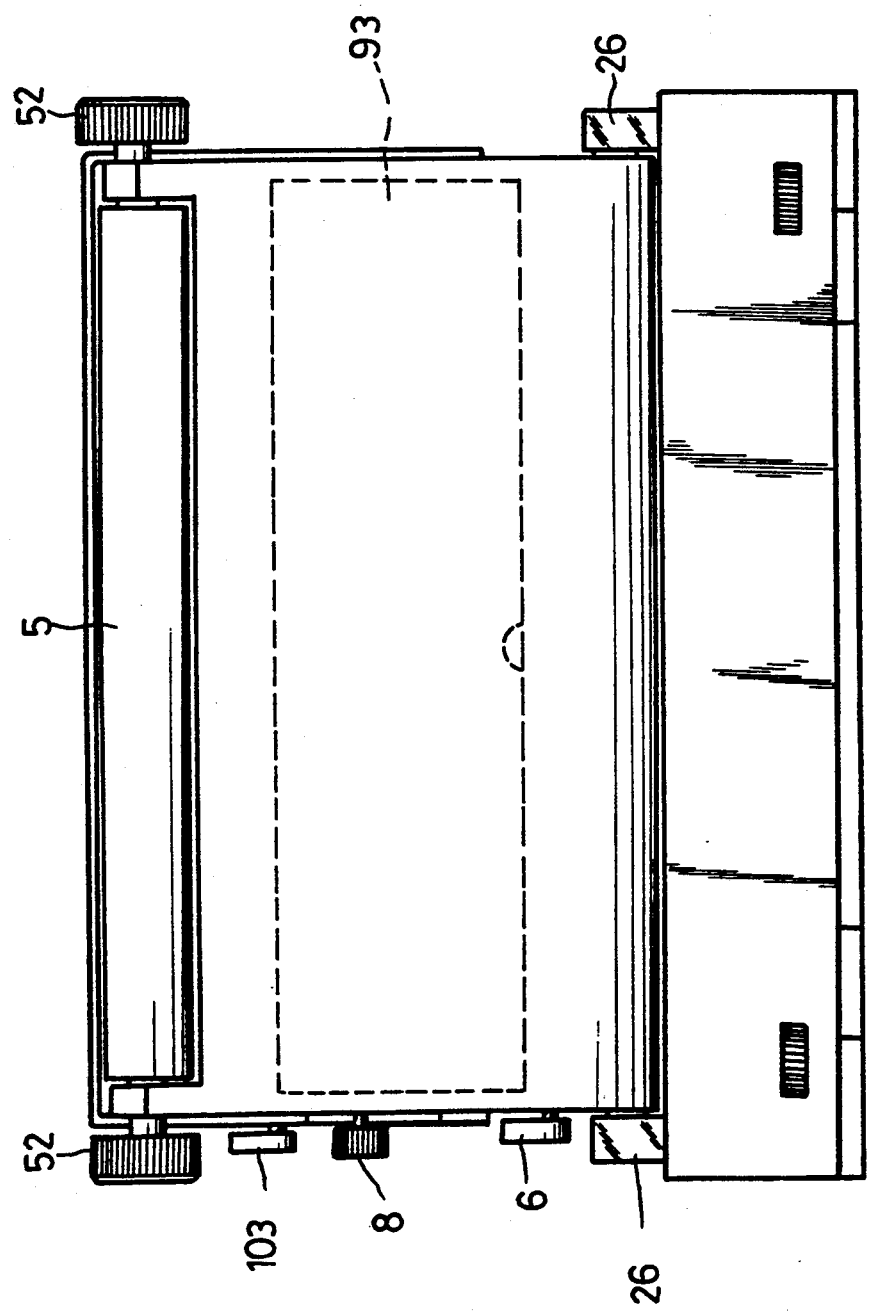
FIG. 10 is a front view of the draft paper rack with a stationery box mounted on the back side thereof.

The roller 5 (as shown in FIGS. 2 and 3) is to be mounted on the draft-paper rack 3 by means of fastening studs 51 mounted in the corresponding arch-shaped groove of the roller seats 31 on the rack 3 respectively; each roller seat 31 has a round hole 312, in which a steel ball 32 and a spring 321 are loaded. The roller 5 can easily be mounted in place by pressing the steel balls 32 downwardly to the fastening studs 51, and mounting the top roller seat 34 in place by having the two flanges 341 engaged with the flanges 311 of the roller seat 31 respectively; finally, the two adjusting knobs 52 are mounted in place by having the holes 53 mounted on the spline part 511 of the fastening studs 51. Since the steel ball 32 is loaded with a spring 321 tension, and when the adjusting knob 52 is rotated by a hand, there are a sound and a slight click feeling upon the roller 5 rotating. An electro-motive adjusting knob 8 is mounted in a round hole 392 for controlling a motor 7, of which a gear 71 is engaged with a gear 54; the electro-motive adjusting knob 8 is designed to have a plurality of rotation scales (as shown in FIG. 6), and when a user pushes the step key 24, the draft paper will move forward or backward a given distance; under the draft-paper rack 3, there are a battery seat 9 and a circuit board 91, which is electrically connected with the step key 24, the backward rotation key 231, the forward rotation key 232, the key switch 233, and the electro-motive adjusting knob 8 (as shown in FIG. 2). A transparent hood 4 is the mounted on front side of the draft-paper rack 3. On one end of the hood 4, there are two cylindrical studs 41 to be mated with a round hole 391 and a sliding slot 33; the upper cylindrical stud 41 is able to move back and forth in the sliding slot 33 for adjusting the tightness of the hood 4; a round hole 45 on the hood 4 is to be mate with a pin 101, which is mounted with a pushing knob 103 and a pushing plate 102; when the pushing knob 103 is turned, the pushing plate 102 will turn around the pin 101 to push the hood 4 open to facilitate draft paper to be mounted in place. The window 46 of the hood 4 is furnished with a line indicator 42; the back side of the hood 4 is furnished with roller supporting arms 441, which are mounted with rollers 44 respectively; the roller 5 and the rollers 44 are mounted in opposite position so as to facilitate a draft paper clamped there between to move up and down. One end of the draft-paper rack 3 has a round hole 393 to receive a pin 61 mounted with an angle-setting knob 6 and a guard plate 62. When the angle-setting knob 6 is turned to set the guard plate 62 in horizontal position, the draft-paper rack 3 can be adjusted at any slanting angle; then, turn the angle-setting knob 6 to set the guard plate 62 in vertical position against the top of the ratchet fastening block 37; in that case, the ratchet fastening block 37 and the ratchet 38 will be unable to move inwards, and the ratchet 38 will tightly push against the ratchet 21 to cause the draft-paper rack 3 unable to turn. The draft-paper rack 3 has a rear lid to have the rack 3 formed into a stationary box 93, which may be set in horizontal position to facilitate making drawing or putting a slippery mouse thereon (as shown in FIG. 10).

Figure 1:
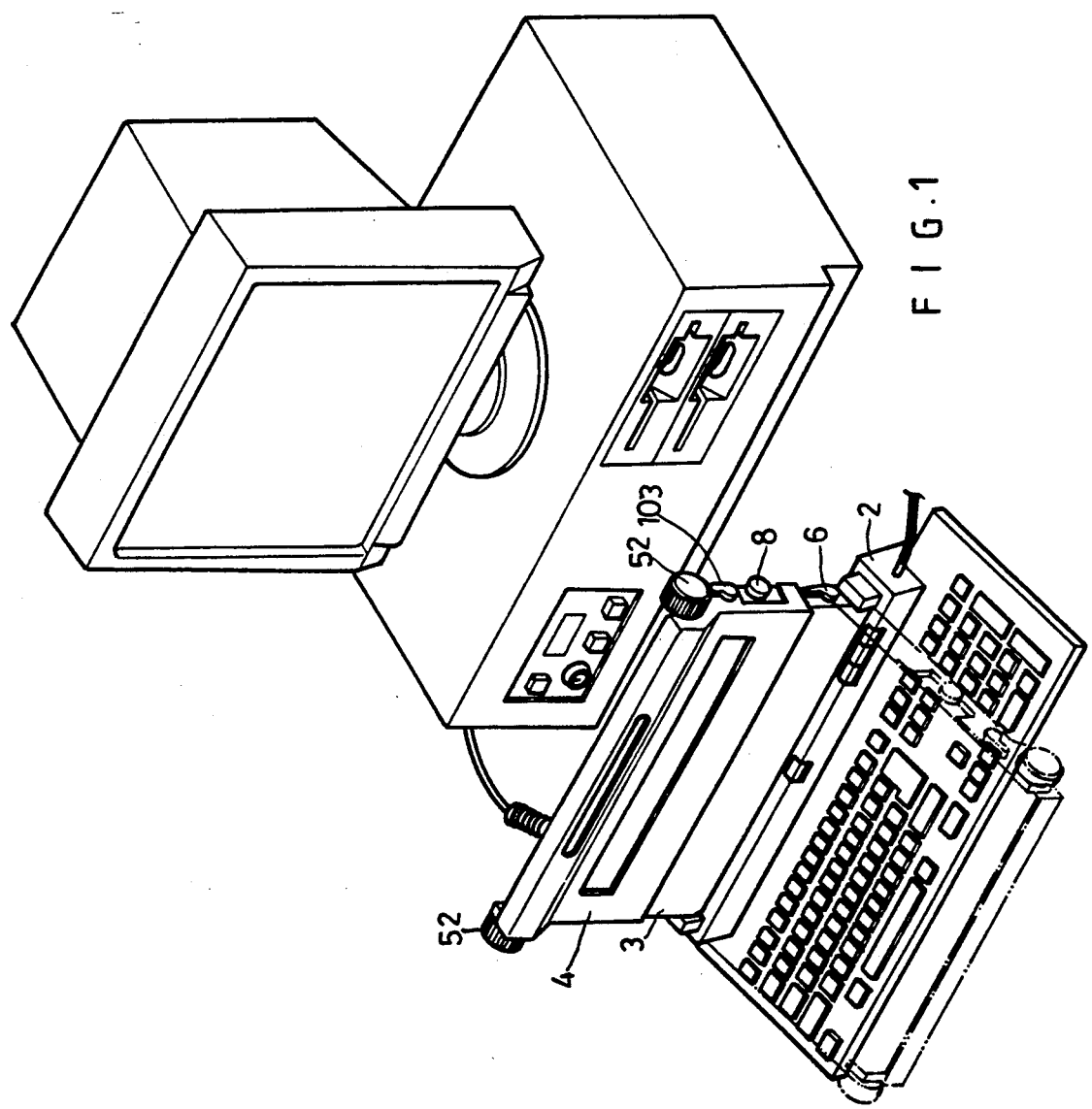
FIG. 1 is a perspective view of an embodiment according to the present invention, being mounted on a keyboard.

Referring to FIG. 1, the present invention is clamped on a keyboard, and by means of the adjusting knob 8, a draft-paper can be moved upwards at a given space so as to have the words on the draft paper input a computer clearly; the draft paper rack can be slanted backwards in various stages (as shown in FIG. 11), and can also be folded forwards to facilitate storage thereof.

I claim:

1. A draft-paper rack structure to be used with a computer for holding paper, comprising:
    a three-piece chassis including three base elements, which are assembled together by means of a plurality of mating flanges and first grooves thereof, wherein at least one of said base elements being able to extend outwardly, and at least one of said base elements having guard blocks and screw rods on top thereof;
    a supporting seat having a seat block on both ends thereof, a step key, a forward rotation key, a backward rotation key, and a switch key, all of which being electrically connected to a circuit board; a power supply terminal being furnished at one end of said supporting seat; a ratchet receiving means; and at least two nuts being furnished thereon to be mated with said corresponding screw rods respectively, for adjustably mounting said supporting seat on said chassis;
    a rack for holding paper; said rack having an upper end, a lower end, two sides and a front face, and a first roller seat at both upper and lower ends thereof; each of said first roller seats having a second groove and a first round hole, in which a ball and a first spring are loaded therewithin; a plurality of second round holes and a sliding slot at both said upper and lower ends of said rack; a second spring and a ratchet fastening block in said second round hole at said lower end whereby said second spring being adapted to push against said ratching fastening block so as to engage it with said ratchet receiving means on said supporting seat after said rack is mounted on said supporting seat; a battery seat and a circuit board being mounted below said rack; a third round hole on one side of said rack; a pushing knob and a pushing plate; a pin receivable by said third round hole for mounting said pushing knob and said pushing plate;
    a transparent hood having a rear side and a plurality of cylindrical studs to be mated with said second round holes and said sliding slot on said rack for mounting said transparent hood on said front side of said rack; a window with a line indicator; a rear side having a plurality of roller supporting arms thereon; and a first roller connected to each of said roller supporting arms;
    a second roller being mounted on said second groove of each of said first roller seats; said second roller containing a fastening stud on both ends thereof for mounting said second roller on said first roller seat, said two second roller seats being mated with said two first roller seats, respectively; each of said fastening studs having a spline portion which pushes said ball in said first roller seat slightly downward; an adjusting knob mounted on said second roller which can be rotated manually to move a draft paper mounted on said rack; an electro-motive adjusting knob; and a motor and a gear being controlled by said electro-motive adjusting knob for rotating said roller to move said draft paper; and means for mounting
    said structure on a computer key board so as to place a draft paper between a computer screen and a keyboard thereof at different slanting angles to provide a clear and easy key-in operation.

* * * * *